(12) United States Patent
Cohen et al.

(10) Patent No.: US 7,706,000 B2
(45) Date of Patent: Apr. 27, 2010

(54) ORIENTATION SENSING OF A ROD

(75) Inventors: Rob Cohen, Kensington, MD (US); Tianning Xu, Duluth, GA (US)

(73) Assignee: Immersion Medical, Inc., Gaithersburg, MD (US)

( * ) Notice: Subject to any disclaimer, the term of this patent is extended or adjusted under 35 U.S.C. 154(b) by 300 days.

(21) Appl. No.: 11/779,503

(22) Filed: Jul. 18, 2007

(65) Prior Publication Data

US 2009/0021752 A1 Jan. 22, 2009

(51) Int. Cl.
*G01B 11/14* (2006.01)

(52) U.S. Cl. ........................ 356/614; 606/130

(58) Field of Classification Search ......... 356/601–623; 700/245, 246; 606/1, 130; 345/156, 161
See application file for complete search history.

(56) References Cited

U.S. PATENT DOCUMENTS

| | | | |
|---|---|---|---|
| 5,623,582 A | 4/1997 | Rosenberg | |
| 6,184,868 B1 | 2/2001 | Shahoian et al. | |
| 6,278,439 B1 | 8/2001 | Rosenberg et al. | |
| 7,296,363 B2 * | 11/2007 | Danisch et al. | 33/556 |
| 2003/0188594 A1 | 10/2003 | Levin et al. | |
| 2008/0162046 A1 * | 7/2008 | Kotian et al. | 701/300 |
| 2009/0012532 A1 * | 1/2009 | Quaid et al. | 606/130 |

OTHER PUBLICATIONS

International Search Report and Written Opinion—PCT/US2008/066396.
Immersion Corporation: "Virtual Laparoscopic Interface" [Online] 2000, pp. 1-1, XP002509910; http://www.inition.co.uk/inition/pdf/3dinput_immersion_virtual_laparoscpic_interface.pdf.

* cited by examiner

*Primary Examiner*—Hoa Q Pham
(74) *Attorney, Agent, or Firm*—Womble Carlyle Sandridge & Rice, PLLC

(57) ABSTRACT

A laparoscopy simulator includes two rods and an orientation sensor that determines the orientation of the rods. An optical sensor is used to determine measurements of each rod based on the rotation of the rod around a central axis of the rod and a sliding of the rod along the central axis. An accelerometer is used to determine additional measurements of each rod based on a rotation of the rod around two additional rotation axes of the simulator. The measurements are used to determine the overall orientation of the rods.

22 Claims, 6 Drawing Sheets

ORIENTATION SENSING OF A ROD

FIELD OF THE INVENTION

One embodiment is directed to sensing the orientation of an object. More particularly, one embodiment is directed to orientation sensing of a rod shaped object.

BACKGROUND INFORMATION

The growth of minimally invasive therapies has led to a growing interest in the potential for computer-based simulation for training. Many computer-based medical simulators have been designed to teach these new techniques. Many of these efforts have focused on laparoscopic surgery, in which rigid tools are inserted into the patient's abdomen and visual feedback is provided by an endoscopic camera that produces a high-definition color image. These simulators can be skills trainers or procedure trainers, and emphasize the three-dimensional hand-eye coordination practice that is useful for laparoscopic surgery.

For these simulators, the orientation of the rigid tools, which are typically rods, must be constantly calculated. Various goniometers or goniometry methods have been used in position and orientation sensing for rods and other devices. Mechanical and optical angle sensors are the most common ways to measure the angle of each linkage that allows movement. However, the use of these sensors often requires precision machined and bulky components as part of the implementation.

Based on the foregoing, there is a need for an improved system and method for determining the orientation of a rod or other object.

SUMMARY OF THE INVENTION

One embodiment is a laparoscopy simulator that includes two rods and an orientation sensor that determines the orientation of the rods. An optical sensor is used to determine measurements of each rod based on the rotation of the rod around a central axis of the rod and a sliding of the rod along the central axis. An accelerometer is used to determine additional measurements of each rod based on a rotation of the rod around two additional rotation axes of the simulator. The measurements are used to determine the overall orientation of the rods.

DETAILED DESCRIPTION

One embodiment of the present invention is a system for calculating the orientation of a rod through the use of an optical sensor and one or more accelerometers.

Figure 1:
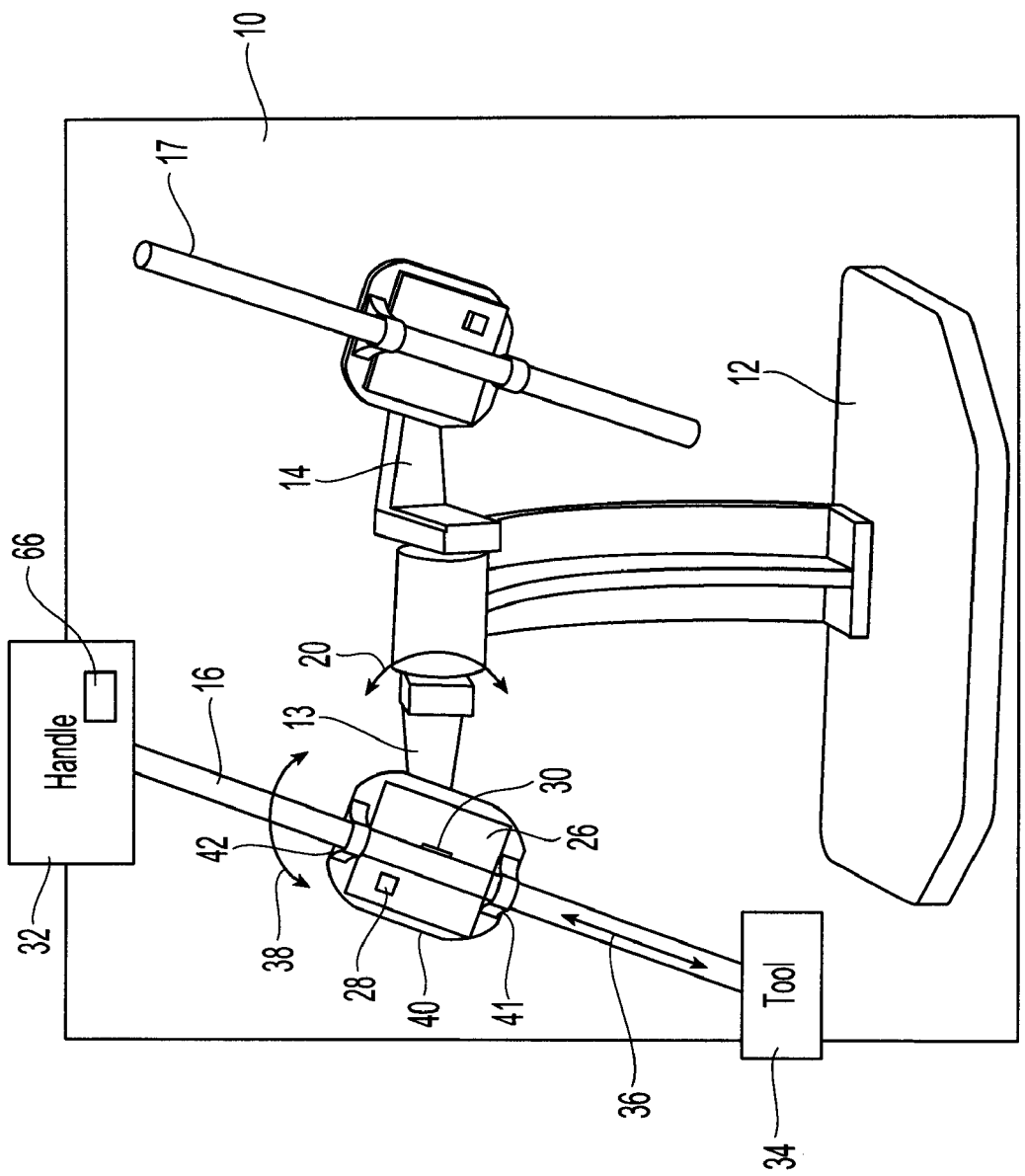
FIG. 1 is a perspective front view of a two rod laparoscopy simulator in accordance with one embodiment.

FIG. 1 is a perspective front view of a two rod laparoscopy simulator 10 in accordance with one embodiment. Simulator 10 includes a base 12 that is fixed to ground. Each rod 16, 17 is coupled to base 12 through an arm 13, 14 that rotates around base 12 via an axis that allows the arms to rotate 360°, as indicated by arrow 20. Rods 16 and 17 and associated components are identical. For rod 16, arm 13 is coupled to a platform 40 through an axis that allows platform 40 to rotate 360°, as indicated by arrow 38. Platform 40 holds rod 16 in place through collars 41, 42. Platform 40 further includes a circuit board 26 that includes an optical sensor 30 and an accelerometer 28. Other simulators may include only one rod, or may have more than two rods or other objects for which the orientation is determined.

Rod 16 can rotate 360° around a central axis 36, and can be moved up and down along central axis 36 through the coupling of collars 41, 42. A handle 32 is coupled to the top of rod 16 for manipulating rod 16, and a tool is coupled to the bottom of rod 16 for simulating the cutting, image capturing, clamping, or other tool functions typically used during laparoscopy. Handle 32 includes an accelerometer 66 for auto calibration purposes. Platform 40 can also be coupled to base 12 using other mechanical means, such as a gimbal, that allows platform 40 to rotate in at least two degrees of freedom or axes relative to base 12.

In summary, simulator 10 permits four movements for each of rods 16 and 17: a slide movement along axis 36; a rotation of the rod around axis 36; a left or right rotation as indicated by arrow 38 ("roll"); and an up and down movement ("pitch"), as indicated by arrow 20. The orientation of the rod through all of these movements needs to be sensed and measured so that simulator 10 provides accurate feedback to the user.

Figure 2:
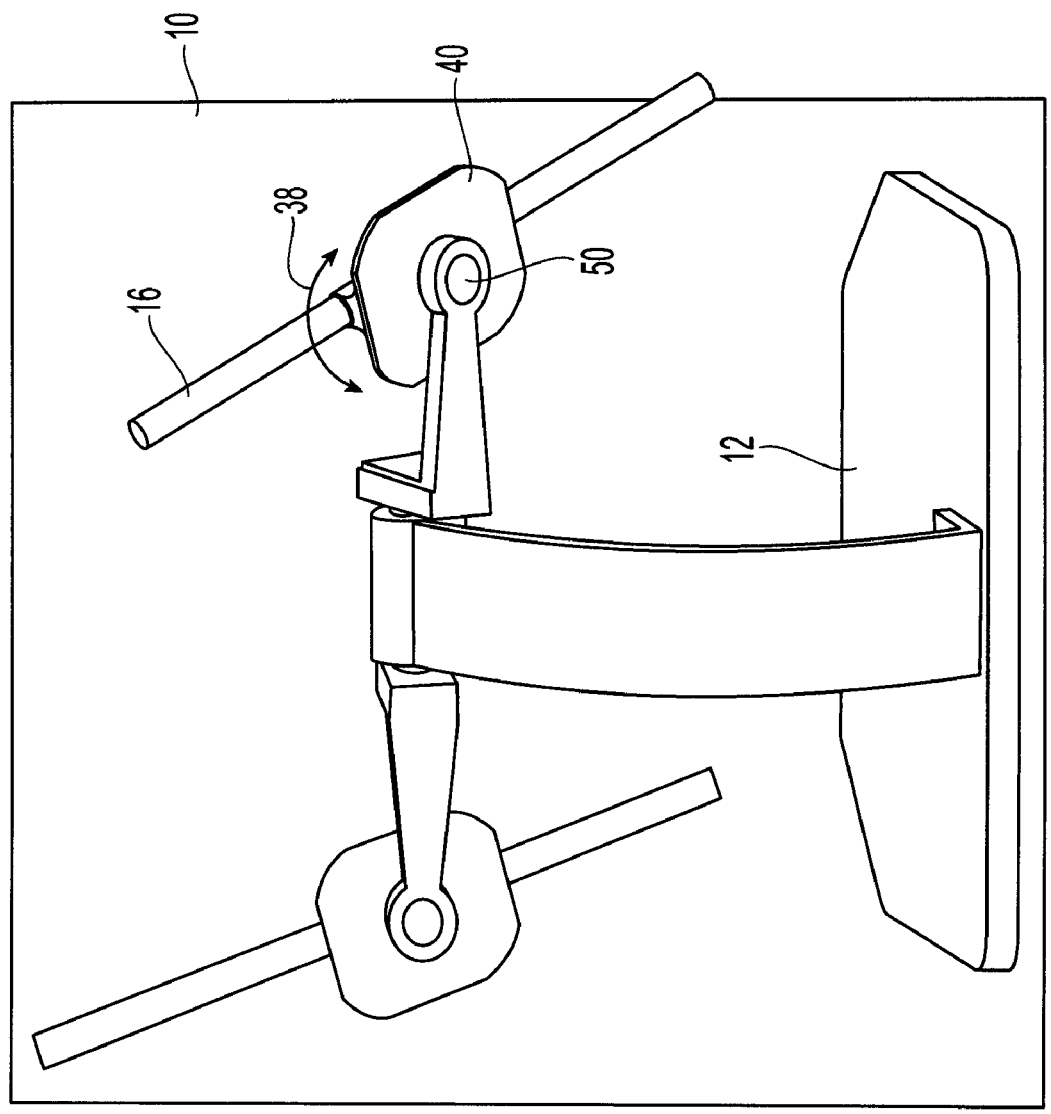
FIG. 2 is a perspective rear view of the two rod laparoscopy simulator in accordance with one embodiment.

FIG. 2 is a perspective rear view of two rod laparoscopy simulator 10 in accordance with one embodiment. FIG. 2 provides a view of axis 50 that allows platform 40 to rotate as indicated by arrow 38.

Figure 3:
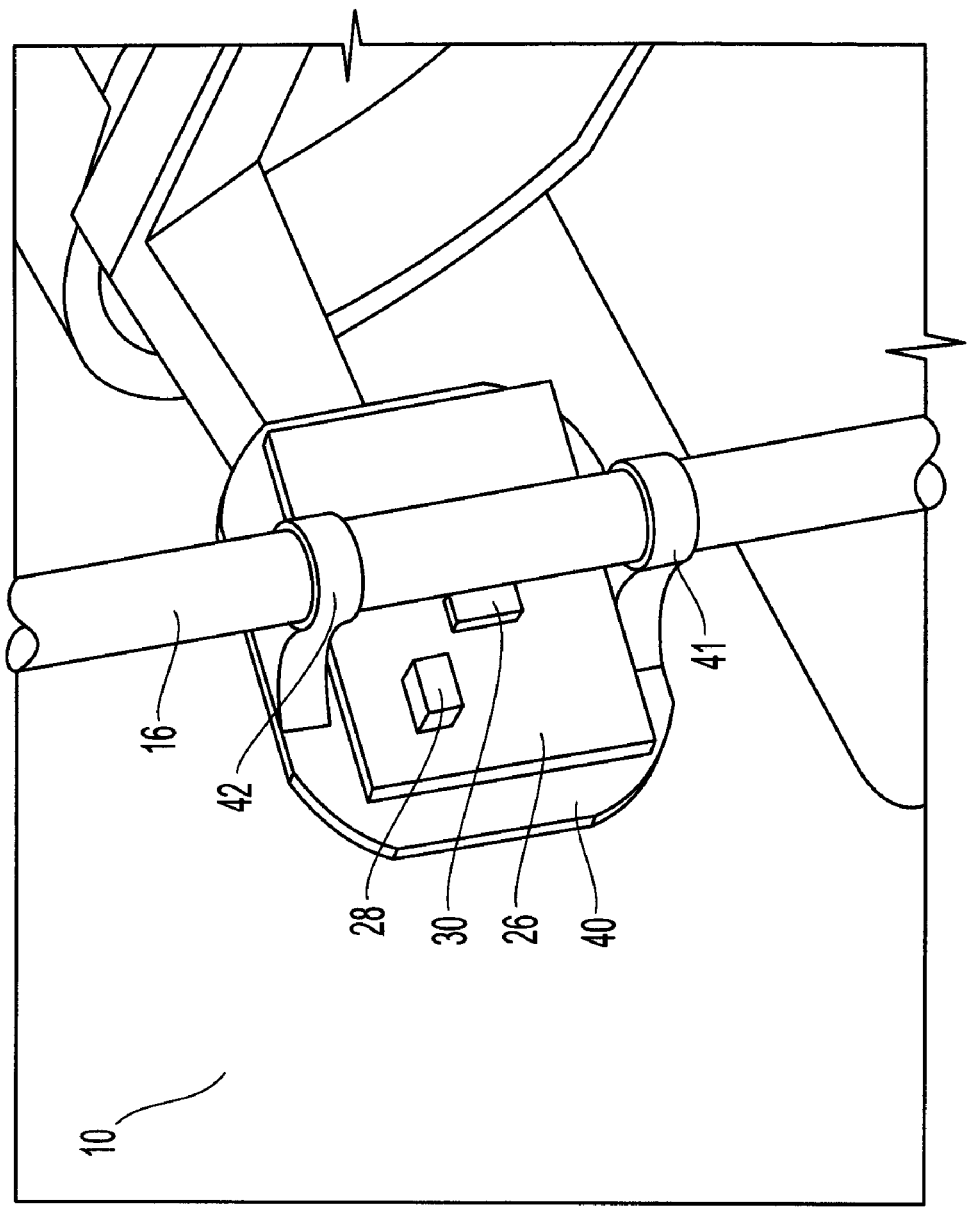
FIG. 3 is a perspective front view of the two rod laparoscopy simulator in accordance with one embodiment.

FIG. 3 is a perspective front view of two rod laparoscopy simulator 10 in accordance with one embodiment. FIG. 3 provides a closer view as compared to FIG. 1 of platform 40, collars 41, 42, circuit board 26, accelerometer 28 and optical sensor 30.

Figure 4:
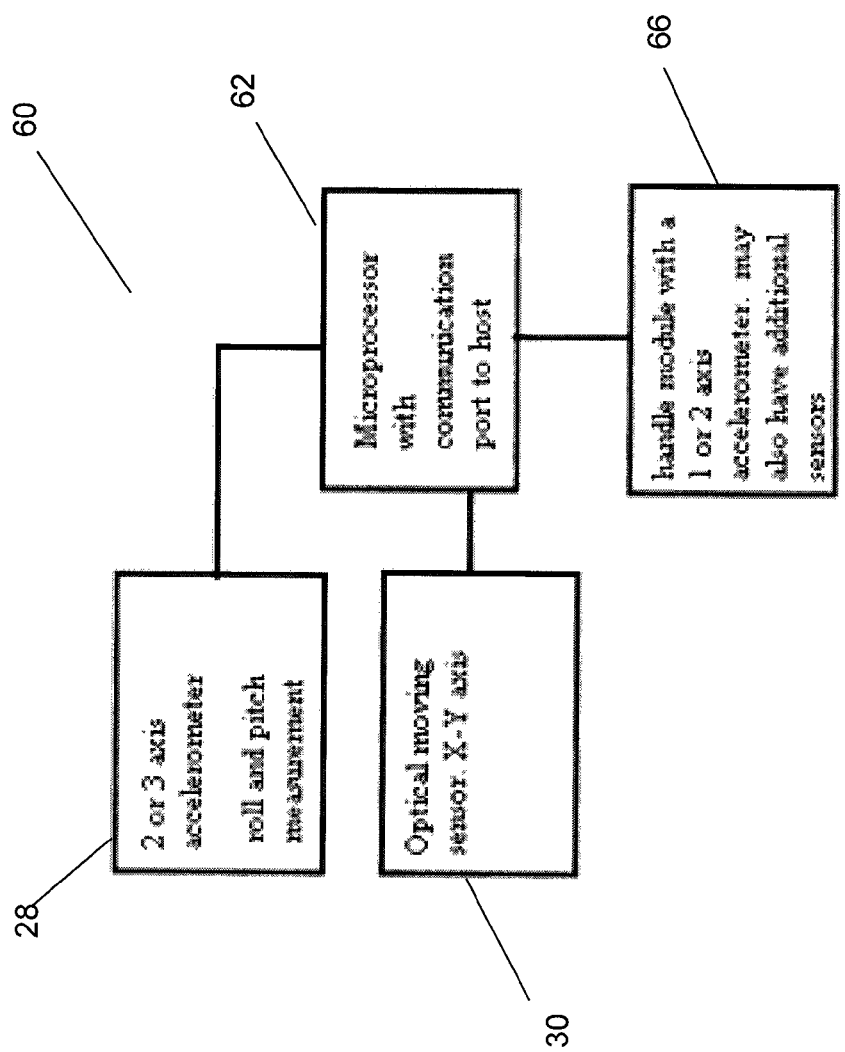
FIG. 4 is a block diagram of an orientation sensor in accordance with one embodiment.

FIG. 4 is a block diagram of an orientation sensor 60 in accordance with one embodiment. Sensor 60 includes a microprocessor 62 that includes a communication port to a host computer that receives the orientation sensor readings and responds accordingly. Microprocessor 62 can be any type of general purpose processor or controller and includes memory for storing instructions that are executed.

Optical sensor 30, coupled to microprocessor 62, is a sensor that can detect movement of rod 16 by viewing its surface. Sensor 30 detects the up and down movement of rod 16 ("Y-axis") and the rotation of rod 16 ("X-axis"). Accelerometer 28, coupled to microprocessor 60, in one embodiment is a micro-electro-mechanical systems ("MEMS") device that determines the pitch (rotation along arrow 20 of FIG. 1) and roll (rotation along arrow 38 of FIG. 1) of rod 16. Accelerometer 28 may be a two or three axes accelerometer or any type of accelerometer that provides positioning information using gravitational comparisons. Accelerometer 28 may be considered a single accelerometer having two or more axes, or may be considered as comprising multiple accelerometers, one for each axis. The four measurements provided by optical sensor 30 and accelerometer 28 allow microprocessor 60 to calculate the orientation of rod 16 at all times.

Further coupled to microprocessor 62 is an accelerometer 66 on a handle module that may be a 1 or 2 axis accelerometer and is located on handle 32. Accelerometer 66 provides auto calibration for the rotation of rod 16. Auto calibration may be desired since the sensing of the rotation of rod 16 is done on a relative basis and therefore the starting point of rod 16 should be determined. Accelerometer 66 provides information to microprocessor 62 to calculate the absolute angle of handle 32.

Figure 5:
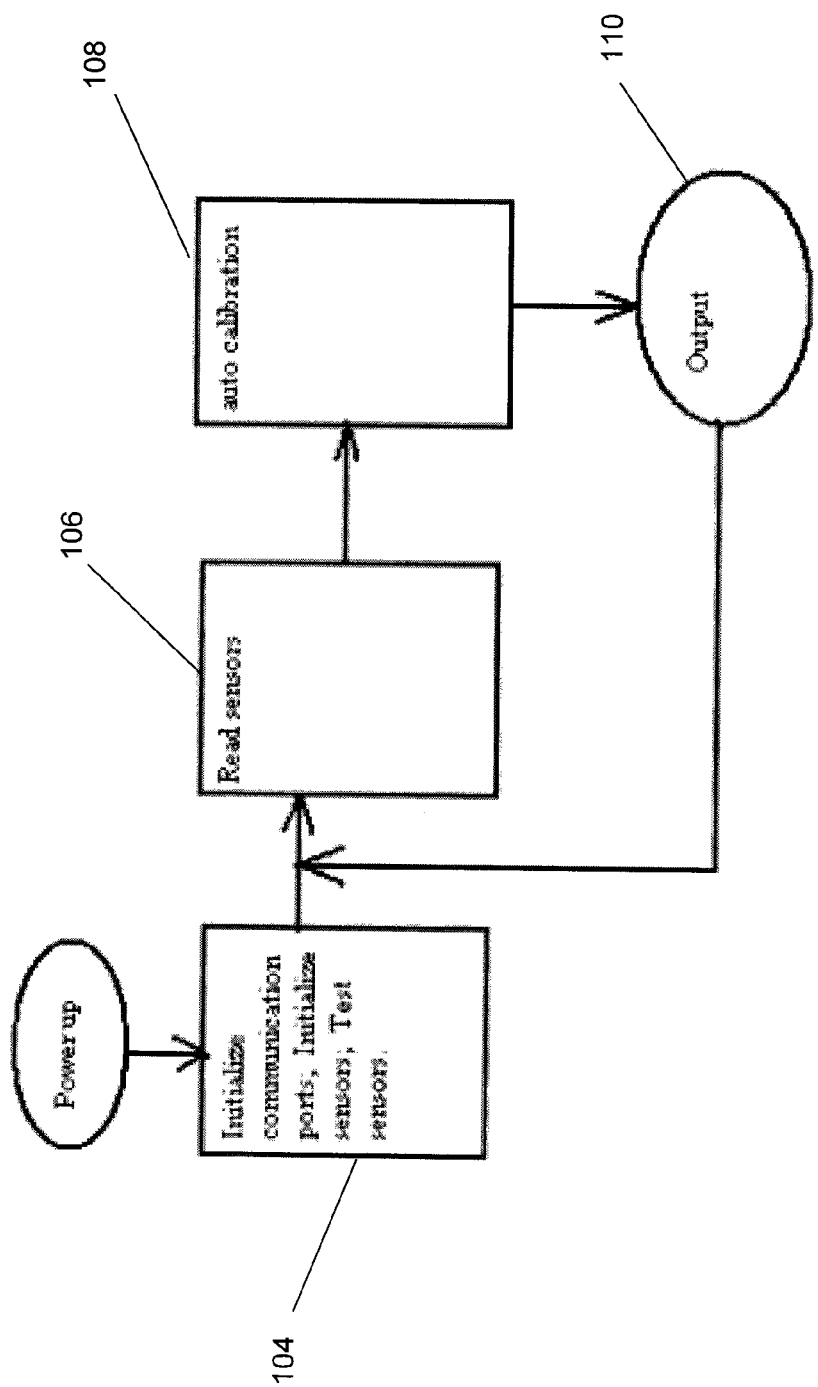
FIG. 5 is a flow diagram of the functionality of the orientation sensor in accordance with one embodiment when determining the orientation of the rod.

FIG. 5 is a flow diagram of the functionality of orientation sensor 60 in accordance with one embodiment when determining the orientation of rod 16. In one embodiment, the functionality of the flow diagram of FIG. 5 is implemented by software stored in memory and executed by a processor. In other embodiments, the functionality can be performed by hardware, or any combination of hardware and software.

After powering up, at 104 the communication ports and sensors (i.e., accelerometer(s) and optical sensor) are initialized and the sensors are tested. At 106 the sensors are read. At 108, the auto calibration routine (disclosed in more detail in conjunction with FIG. 6) is performed. The results of the orientation determination is output at 110 and the flow returns to 104.

Figure 6:
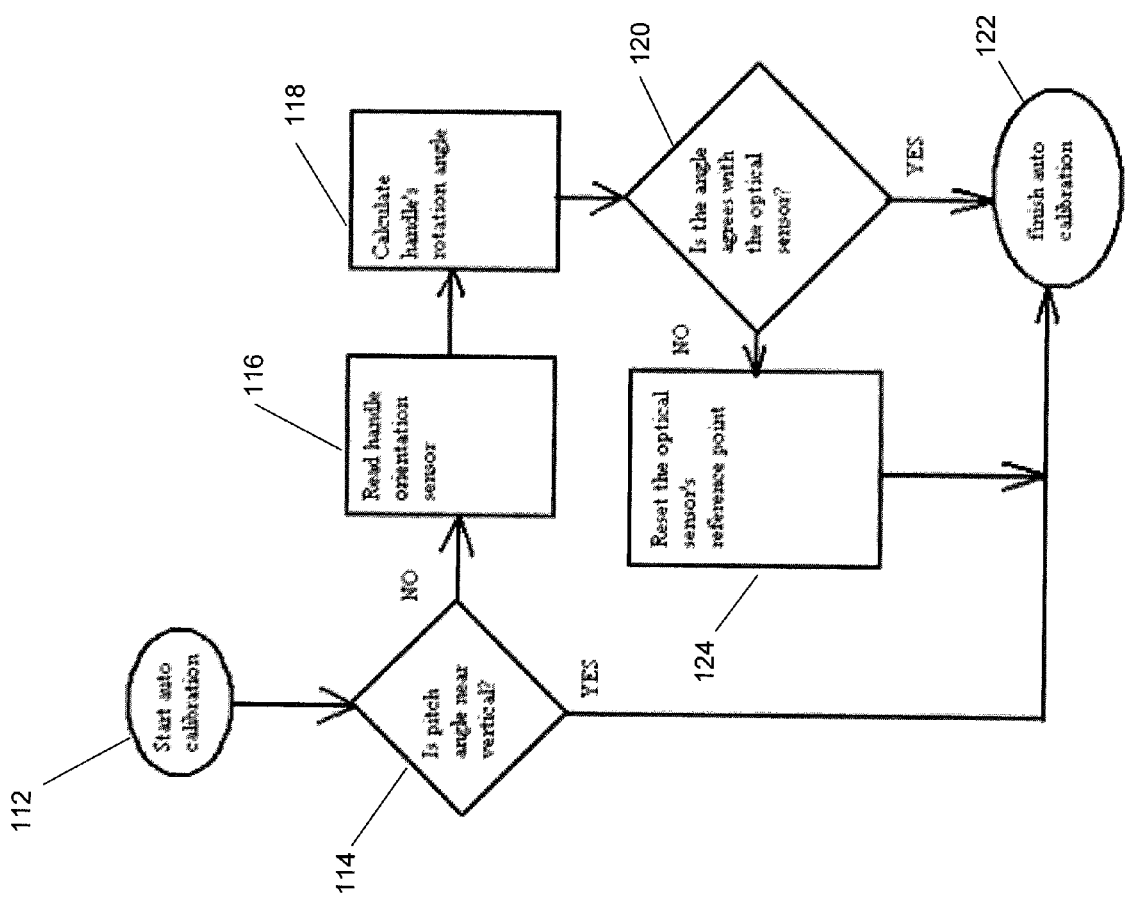
FIG. 6 is a flow diagram of the functionality of the orientation sensor in accordance with one embodiment when auto calibrating the orientation sensor in order to determine the orientation of the rod.

FIG. 6 is a flow diagram of the functionality of orientation sensor 60 in accordance with one embodiment when auto calibrating orientation sensor 60 in order to determine the orientation of rod 16. In one embodiment, the functionality of the flow diagram of FIG. 6 is implemented by software stored in memory and executed by a processor. In other embodiments, the functionality can be performed by hardware, or any combination of hardware and software.

At 112, auto calibration begins. At 114, it is determined if the pitch angle of rod 16 is near vertical. If yes, then the auto calibration will not be effective because accelerometer 66 requires an angle and flow continues to 122 where the auto calibration is ended. Typically, rod 16 will be at an angle during the majority of its operation since a user will be physically uncomfortable operating simulator 10 when the rods are straight up and down.

If yes at 114, accelerometer 66 is read at 116, and the rotation angle of handle 32 is calculated. At 120, it is determined if the rotation angle is equal to the reading of optical sensor 30. If yes, then flow continues to 122 where the auto calibration is ended. If no at 120, the reference point of optical sensor 30 is reset to coincide with the determined rotation angle and flow continues to 122 where the auto calibration is ended.

As disclosed, embodiments can determine the orientation of rods used for laparoscopy simulation without having to use bulky and expensive angle sensors. The combination of an optical sensor and one or two accelerometers enable all movements of the rod to be determined.

Several embodiments are specifically illustrated and/or described herein. However, it will be appreciated that modifications and variations are covered by the above teachings and within the purview of the appended claims without departing from the spirit and intended scope of the invention.

For example, although the orientation of a rod is disclosed in the above embodiments, in other embodiments the orientation of other objects can be determined.

What is claimed is:

1. A method of determining an orientation of an object comprising:
   determining a first measurement and a second measurement of the object using an optical sensor, the second measurement indicating a rotational movement of the object about a central axis of the object;
   determining a third measurement and a fourth measurement of the object using a first accelerometer; and
   determining the orientation of the object using the first measurement, the second measurement, the third measurement and the fourth measurement.

2. The method of claim 1, wherein determining the first measurement comprises an indication of a sliding movement of the object along the central axis.

3. The method of claim 1, wherein determining the third measurement comprises detecting a rotating movement of the object around a first axis.

4. The method of claim 3, wherein determining the fourth measurement comprises detecting a rotating movement of the object around a second axis.

5. The method of claim 1, wherein the object is a rod.

6. The method of claim 1, wherein the object comprises a handle, further comprising:
   auto calibrating a starting point of the handle using a second accelerometer.

7. The method of claim 6, wherein the auto calibrating comprises determining whether the object is substantially vertical.

8. A medical instrument simulator comprising:
   a base;
   an arm coupled to the base;
   a platform coupled to the arm, said platform adapted to rotate around a first axis and a second axis;
   a rod coupled to the platform;
   an optical sensor coupled to the platform, the optical sensor configured to generate a first output that indicates a first movement of the rod; and
   a first accelerometer coupled to the platform, the first accelerometer configured to generate a second output that indicates a second movement of the rod.

9. The simulator of claim 8, the rod comprising a central axis, wherein the first output indicates a sliding movement of the rod along the central axis and a rotating movement of the rod along the central axis.

10. The simulator of claim 8, wherein the second output indicates a first rotating movement of the rod along the first axis and a second rotating movement of the rod along the second axis.

11. The simulator of claim 8, further comprising a handle coupled to the rod and a second accelerometer coupled to the handle, wherein the second accelerometer is adapted to detect a starting point of the handle.

12. A method of determining an orientation of a rod comprising:
   receiving a first output of an optical sensor, the first output comprising a first rotation measurement of a rod around a central axis of the rod and a slide measurement that measures a sliding movement of the rod along the central axis; and
   receiving a second output of a first accelerometer, the second output comprising a second rotation measurement of the rod around a first axis and a third rotation measurement of the rod around a second axis; and calculating the orientation based on the first and second output.

13. The method of claim 12, wherein the rod is coupled to a handle, the method further comprising:
   receiving a third output of a second accelerometer coupled to the handle; and
   calculating a starting point of the handle based on the third output.

14. The method of claim 13, the calculating the starting point comprising determining whether the rod is substantially vertical.

15. A computer readable medium having instructions stored thereon for determining an orientation of an object that, when executed by a processor, cause the processor to:
   determine a first measurement and a second measurement of the object based on data received from an optical sensor, the second measurement indicating a rotational movement of the object about a central axis of the object;
   determine a third measurement and a fourth measurement of the object based on data received from a first accelerometer; and
   determine the orientation of the object using the first measurement, the second measurement, the third measurement and the fourth measurement.

16. The computer readable medium of claim 15, wherein said determine the first measurement comprises receive a sliding movement of the object.

17. The computer readable medium of claim 15, wherein said determine the second measurement comprises receive a rotating movement of the object around a central axis of the object.

18. The computer readable medium of claim 15, wherein said determine the third measurement comprises receive a rotating movement of the object around a first axis.

19. The computer readable medium of claim 18, wherein said determine the fourth measurement comprises receive a rotating movement of the object around a second axis.

20. The computer readable medium of claim 15, wherein the object is a rod.

21. The computer readable medium of claim 15, the instructions when executed further cause the processor to:
auto calibrate a starting point of a handle coupled to the object using a second accelerometer.

22. An apparatus for determining an orientation of an object comprising:
   means for determining a first measurement and a second measurement of the object using an optical sensor, the second measurement indicating a rotational movement of the object about a central axis of the object;
   means for determining a third measurement and a fourth measurement of the object using a first accelerometer; and
   means for determining the orientation of the object using the first measurement, the second measurement, the third measurement and the fourth measurement.

* * * * *